(12) United States Patent
Storhaug et al.

(10) Patent No.: US 11,878,743 B2
(45) Date of Patent: Jan. 23, 2024

(54) ASSIST MECHANISM FOR MOVING CAB ON POWER MACHINE

(71) Applicant: Clark Equipment Company, West Fargo, ND (US)

(72) Inventors: Benjamin Storhaug, Bismarck, ND (US); Daniel J. Krieger, Bismarck, ND (US)

(73) Assignee: DOOSAN BOBCAT NORTH AMERICA INC., West Fargo, ND (US)

( * ) Notice: Subject to any disclaimer, the term of this patent is extended or adjusted under 35 U.S.C. 154(b) by 168 days.

(21) Appl. No.: 17/406,416

(22) Filed: Aug. 19, 2021

(65) Prior Publication Data

US 2022/0056668 A1   Feb. 24, 2022

Related U.S. Application Data

(60) Provisional application No. 63/068,043, filed on Aug. 20, 2020.

(51) Int. Cl.
*B62D 33/067* (2006.01)
*E02F 9/16* (2006.01)

(52) U.S. Cl.
CPC ............ *B62D 33/067* (2013.01); *E02F 9/166* (2013.01)

(58) Field of Classification Search
CPC ....... E02F 9/166; E02F 3/3414; B62D 33/067
USPC ............. 296/190.05, 190.07, 190.04, 190.06
See application file for complete search history.

(56) References Cited

U.S. PATENT DOCUMENTS

| 3,642,316 | A | | 2/1972 | Porth et al. | |
|---|---|---|---|---|---|
| 3,948,341 | A | | 4/1976 | Foster | |
| 4,116,484 | A | * | 9/1978 | Mangless | B62D 33/067 296/190.07 |
| 4,401,179 | A | | 8/1983 | Anderson | |
| 4,408,672 | A | * | 10/1983 | Albright | B60R 21/131 180/89.16 |
| 4,811,983 | A | * | 3/1989 | Watts | F16F 9/0254 248/407 |
| 5,524,722 | A | * | 6/1996 | Bowman | B60N 2/10 297/331 |
| 5,547,244 | A | * | 8/1996 | Lee | B62D 33/0617 296/102 |
| 5,918,694 | A | * | 7/1999 | Miller | E02F 9/2004 180/328 |

(Continued)

FOREIGN PATENT DOCUMENTS

WO   2016108295 A1   4/2017

*Primary Examiner* — Jason S Morrow
(74) *Attorney, Agent, or Firm* — John Veldhuis-Kroeze; Westman, Champlin & Koehler, P.A.

(57) ABSTRACT

A power machine having a frame and a cab pivotally attached to the frame at a first cab pivot, such that the cab pivots about a first transverse axis from an operational position to a service position, includes a link mechanism and a first spring. The link mechanism includes a first link having a first link end, a second link end, and a first pivot engagement feature pivotally coupling the first link to the frame and to the cab such that the first link is pivotal about the first transverse axis. The second link end is configured to interface with the cab at a position forward of and below the first cab pivot and first pivot engagement feature when the cab is in the operational position.

20 Claims, 9 Drawing Sheets

(56) References Cited

U.S. PATENT DOCUMENTS

| | | | | |
|---|---|---|---|---|
| 5,941,330 | A | * | 8/1999 | Miller .................. E02F 3/3405 180/328 |
| 6,102,471 | A | * | 8/2000 | Sasser .................... E02F 9/166 296/190.04 |
| 6,145,613 | A | | 11/2000 | Thompson et al. |
| 6,854,546 | B2 | * | 2/2005 | Beckstrom ........... B62D 33/067 180/89.13 |
| 7,849,946 | B2 | | 12/2010 | Åkeson et al. |
| 8,096,379 | B2 | | 1/2012 | Marsolek et al. |
| 8,408,637 | B1 | | 4/2013 | Dilts |
| 8,448,735 | B2 | | 5/2013 | Vierkant et al. |
| 2007/0145779 | A1 | * | 6/2007 | Jones ................ B62D 33/0617 296/190.04 |
| 2010/0143086 | A1 | * | 6/2010 | Yasuda ................ E02F 3/3414 414/697 |
| 2016/0288845 | A1 | * | 10/2016 | Honda .................. B60K 13/04 |

* cited by examiner

ASSIST MECHANISM FOR MOVING CAB ON POWER MACHINE

CROSS-REFERENCE TO RELATED APPLICATION(S)

This application claims priority to U.S. provisional application No. 63/068,043, filed on Aug. 20, 2020, the content of which is hereby incorporated by reference in its entirety.

BACKGROUND

This disclosure is directed toward power machines. More particularly, this disclosure is directed toward cabs of power machines that are moveable between an operational position and a service position and assist mechanisms for moving cabs between the operational and service positions.

Power machines, for the purposes of this disclosure, include any type of machine that generates power for the purpose of accomplishing a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Many skid steer loaders and other similar compact equipment power machines have a cab mounted on a frame such that the cab can be rotated from a lowered or operational position into a raised or service position to allow access to components within the frame. The cab can be pivotally mounted to the frame, for example though a pair of mounts on the frame. Typically, one or more springs are provided to assist movement of the cab between these lowered and raised positions. As the weight of cabs increases, it becomes more difficult to lift the cab, requiring heavier springs, which can add stress to the cab mounts and cab structure as well.

The discussion above is merely provided for general background information and is not intended to be used as an aid in determining the scope of the claimed subject matter.

SUMMARY

Disclosed embodiments include power machines, such as loaders, and methods and mechanism for aiding in moving a cab between a lowered operational position and a raised service position.

One general aspect includes a power machine (300) including: a frame (310); a cab (350) pivotally attached to the frame at a first cab pivot (320-1) proximate a rear (354) of the cab such that the cab is configured to be pivoted backwards, relative to a front (312) of the frame, about a first transverse axis (322) from an operational position to a service position; a link mechanism (330), the link mechanism including a first link (332-1) having a first link end (334-1), a second link end (336-1), and a first pivot engagement feature (338-1) pivotally coupling the first link to the frame and to the cab such that the first link is pivotal about the first transverse axis, where the second link end (336-1) is configured to interface with the cab (350) at a position forward of and below the first cab pivot (320-1) and first pivot engagement feature (338-1) when the cab is in the operational position; and a first gas spring (340-1) pivotally attached to the frame (310) at a first spring joint (342-1) positioned below the first cab pivot (320-1) and first pivot engagement feature (338-1), the first gas spring being pivotally attached to the first link (332-1) at a second spring joint (344-1) positioned above the second link end (336-1) of the first link when the cab is in the operational position. While in the embodiment shown and described herein references gas springs, in other embodiments, other springs can be used to urge the cab to an upward position.

Implementations may include one or more of the following features. The power machine where the first pivot engagement feature (338-1) is positioned proximate the first link end (334-1). The power machine where the second spring joint (344-1) is also positioned rearward of the second link end (336-1) when the cab is in the operational position. The power machine where the frame (310) includes first and second frame mounts (410-1, 410-2) on opposing sides of the power machine, where the first cab pivot (320-1) extends through the first frame mount (410-1), and where the power machine includes a second cab pivot (320-2) extending through the second frame mount (410-2) and pivotally attaching the cab to the frame such that the cab is configured to be pivoted backwards, relative to the front (312) of the frame, about the first transverse axis (322) from the operational position to the service position. The power machine where the cab includes first and second cab mounts (450-1; 450-2) on opposing sides of the power machine, where the first cab pivot (320-1) also extends through the first cab mount (450-1), and where the second cab pivot (320-2) also extends through the second cab mount (450-2). The power machine where the second link end (336-1) of the first link (332-1) is positioned, in a front-to-back direction, between a center of gravity (356) of the cab and the first cab pivot (320-1) and first pivot engagement feature (338-1) when the cab is in the operational position. The power machine and further including a bumper (480) formed from vibration dampening material, the bumper positioned between the second link end (336-1) and the cab (350) such that the second link end interfaces with the cab through the bumper. The power machine where the first link (332-1) includes first and second link arms (442) which provide the first link end (334-1). The power machine where each of the first and second link arms (442) of the first link include finger members (444) at the first link end, the finger members forming a gap (446) for the first pivot engagement feature (338-1). The power machine where the finger members (444) are configured to be positioned over the first cab pivot (320-1) with the first cab pivot positioned in the gap (446).

One general aspect includes a link mechanism (330) and gas spring (340) apparatus for a power machine, the power machine having a frame (310) and a cab (350) pivotally attached to the frame at a first cab pivot (320-1) proximate a rear (354) of the cab such that the cab is configured to be pivoted backwards, relative to a front (312) of the frame, about a first transverse axis (322) from an operational position to a service position, the link mechanism and gas spring apparatus including: a first link (332-1) of the link mechanism (330) having a first link end (334-1), a second link end (336-1), and a first pivot engagement feature (338-1) pivotally coupling the first link to the frame and to the cab such that the first link is pivotal about the first transverse axis, where the second link end (336-1) is configured to interface with the cab (350) at a position forward of and below the first cab pivot (320-1) and first pivot engagement feature (338-1) when the cab is in the operational position; and a first gas spring (340-1) pivotally attached to the frame (310) at a first spring joint (342-1) positioned below the first cab pivot (320-1) and first pivot engagement feature (338-1), the first gas spring being pivotally attached to the first link (332-1) at a second spring joint (344-1) positioned above the second link end (336-1) when the cab is in the operational position.

Implementations may include one or more of the following features. The link mechanism and gas spring apparatus where the first pivot engagement feature (338-1) is positioned proximate the first link end (334-1). The link mechanism and gas spring apparatus where the second spring joint (344-1) is also positioned rearward of the second link end (336-1) when the cab is in the operational position. The link mechanism and gas spring apparatus where the second link end (336-1) of the first link (332-1) is positioned, in a front-to-back direction, between a center of gravity (356) of the cab and the first cab pivot (320-1) and first pivot engagement feature (338-1) when the cab is in the operational position. The link mechanism and gas spring apparatus where the power machine frame (310) includes a first frame mount (410-1), where the power machine cab (350) includes a first cab mount (450-1), where the first cab pivot (320-1) extends through the first frame mount (410-1) and the first cab mount (450-1), and where the first link (332-1) includes first and second link arms (442) which provide the first link end (334-1) adjacent the first frame mount and the first cab mount. The link mechanism and gas spring apparatus where the first link (332-1) includes first and second link arms (442) which provide the first link end (334-1). The link mechanism and gas spring apparatus where each of the first and second link arms (442) of the first link include finger members (444) at the first link end, the finger members forming a gap (446) for the first pivot engagement feature (338-1). The link mechanism and gas spring apparatus where the finger members (444) are configured to be positioned over the first cab pivot (320-1) with the first cab pivot positioned in the gap (446). The link mechanism and gas spring apparatus and further including a bumper (480) formed from vibration dampening material, the bumper positioned between the second link end (336-1) and the cab (350) such that the second link end interfaces with the cab through the bumper. The link mechanism and gas spring apparatus where the link mechanism (330) further includes a second link (332-2) having a first link end (334-2), a second link end (336-2), and a second pivot engagement feature (338-2) pivotally coupling the second link to the frame and to the cab such that the second link is also pivotal about the first transverse axis (322), where the second link end (336-2) of the second link is configured to interface with the cab (350) at a second position forward of and below the second cab pivot (320-2) and second pivot engagement feature (338-2) when the cab is in the operational position. The link mechanism and gas spring apparatus and further including a second gas spring (340-2) pivotally attached to the frame (310) at a first second spring joint (342-2) positioned below the second cab pivot (320-2) and second pivot engagement feature (338-1), the second gas spring being pivotally attached to the second link (332-2) at a second spring joint (344-2) positioned above the second link end (336-2) of the second link when the cab is in the operational position.

Implementations may include one or more of the following features. The link mechanism and gas spring apparatus where the link mechanism (330) further includes a second link (332-2) having a first link end (334-2), a second link end (336-2), and a second pivot engagement feature (338-2) pivotally coupling the second link to the frame and to the cab such that the second link is also pivotal about the first transverse axis (322), where the second link end (336-2) of the second link is configured to interface with the cab (350) at a second position forward of and below the second cab pivot (320-2) and second pivot engagement feature (338-2) when the cab is in the operational position, the link mechanism and gas spring apparatus further including a second gas spring (340-2) pivotally attached to the frame (310) at a first second spring pivot (342-2) positioned below the second cab pivot (320-2) and second pivot engagement feature (338-1), the second gas spring being pivotally attached to the second link (332-2) at a second spring joint (344-2) positioned above the second link end (336-2) of the second link when the cab is in the operational position.

This Summary and the Abstract are provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

DETAILED DESCRIPTION

The concepts disclosed in this discussion are described and illustrated with reference to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Disclosed embodiments provide a linkage mechanism configured to be positioned between a gas spring and a power machine cab to aid in lifting/rotating the cab about a cab pivot from a lowered or operational position to a raised or service position. The linkage mechanism is configured to engage a fastener that pivotally couples the cab to the frame of the power machine such that linkages of the linkage mechanism pivot about the same transverse axis as the cab pivots. The linkages are further configured to contact the cab, for example via a rubber bumper, at a position that is further away from the cab pivot axis than is the case with a conventional connection location between the gas spring and cab. This new connection linkage mechanism configuration, and corresponding interaction between the cab and gas spring mechanism, significantly reduces the load on the rear cab isolators (e.g., by roughly 50%) and significantly reduces the stress on the rear cab mounts.

Figure 2:
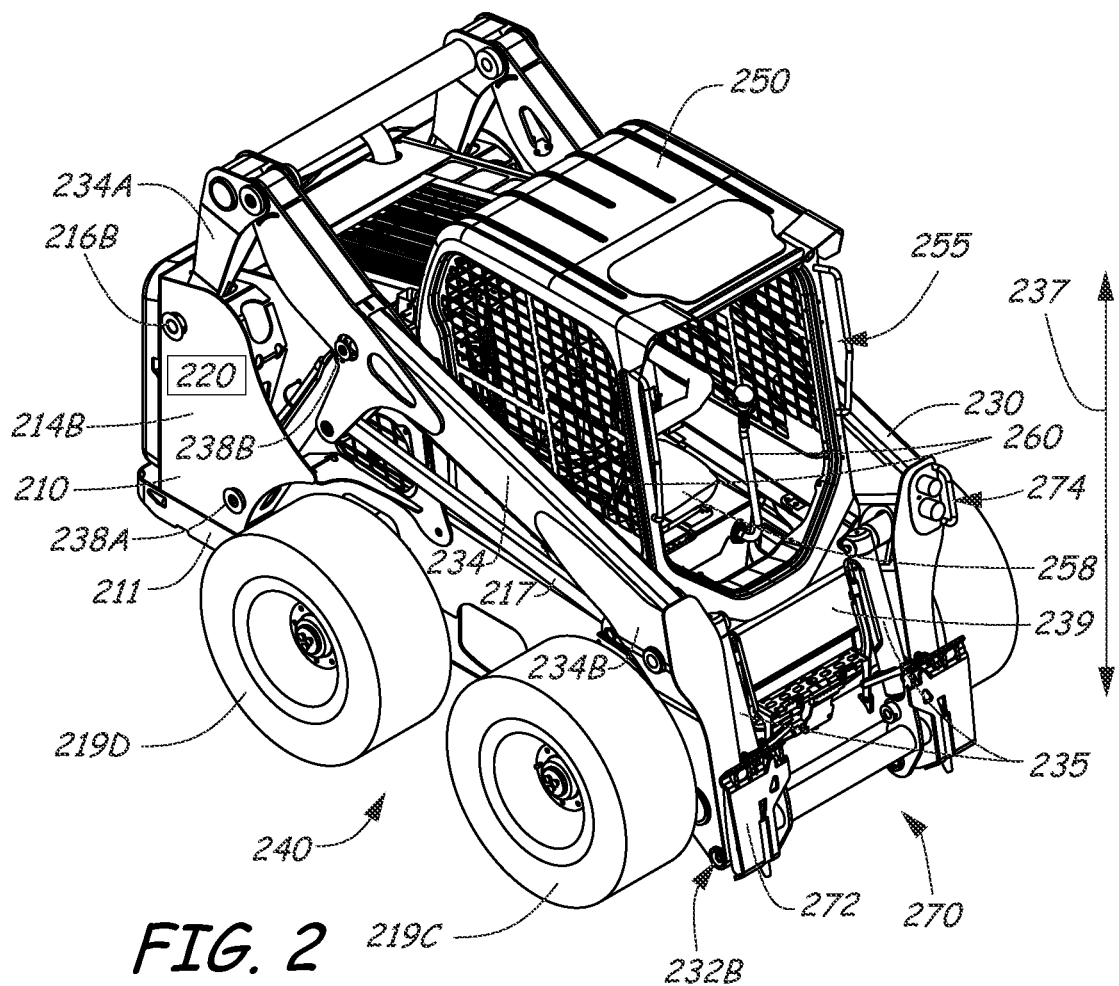
FIGS. 2-3 illustrate perspective views of a representative power machine in the form of a skid-steer loader of the type on which the disclosed embodiments can be practiced.
Figure 3:
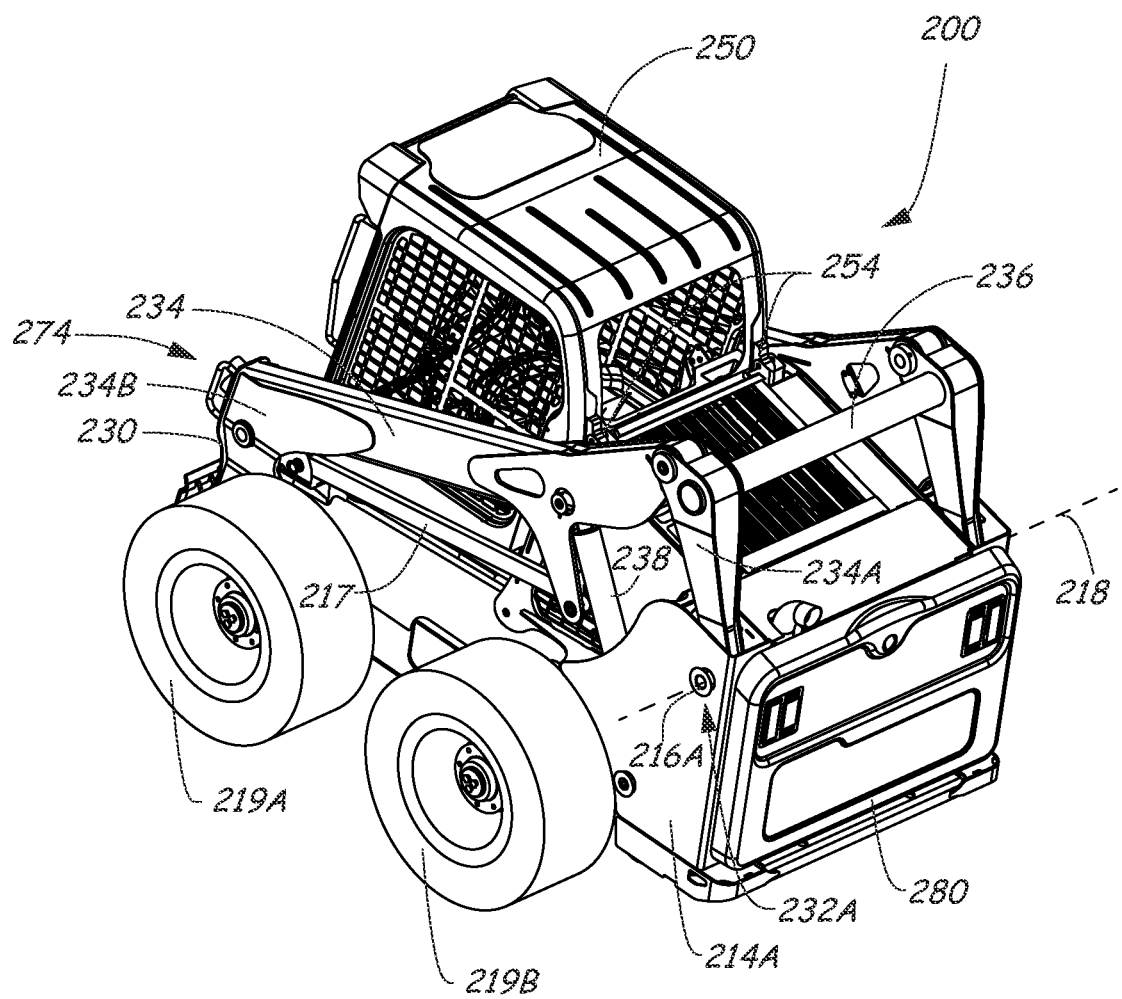

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is illustrated and discussed as being a representative power machine. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that is capable of providing power to the work element to accomplish a work task. One type of power machine is a self-propelled work vehicle. Self-propelled work vehicles are a class of power machines that include a frame, work element, and a power source that is capable of providing power to the work element. At least one of the work elements is a motive system for moving the power machine under power.

Figure 1:
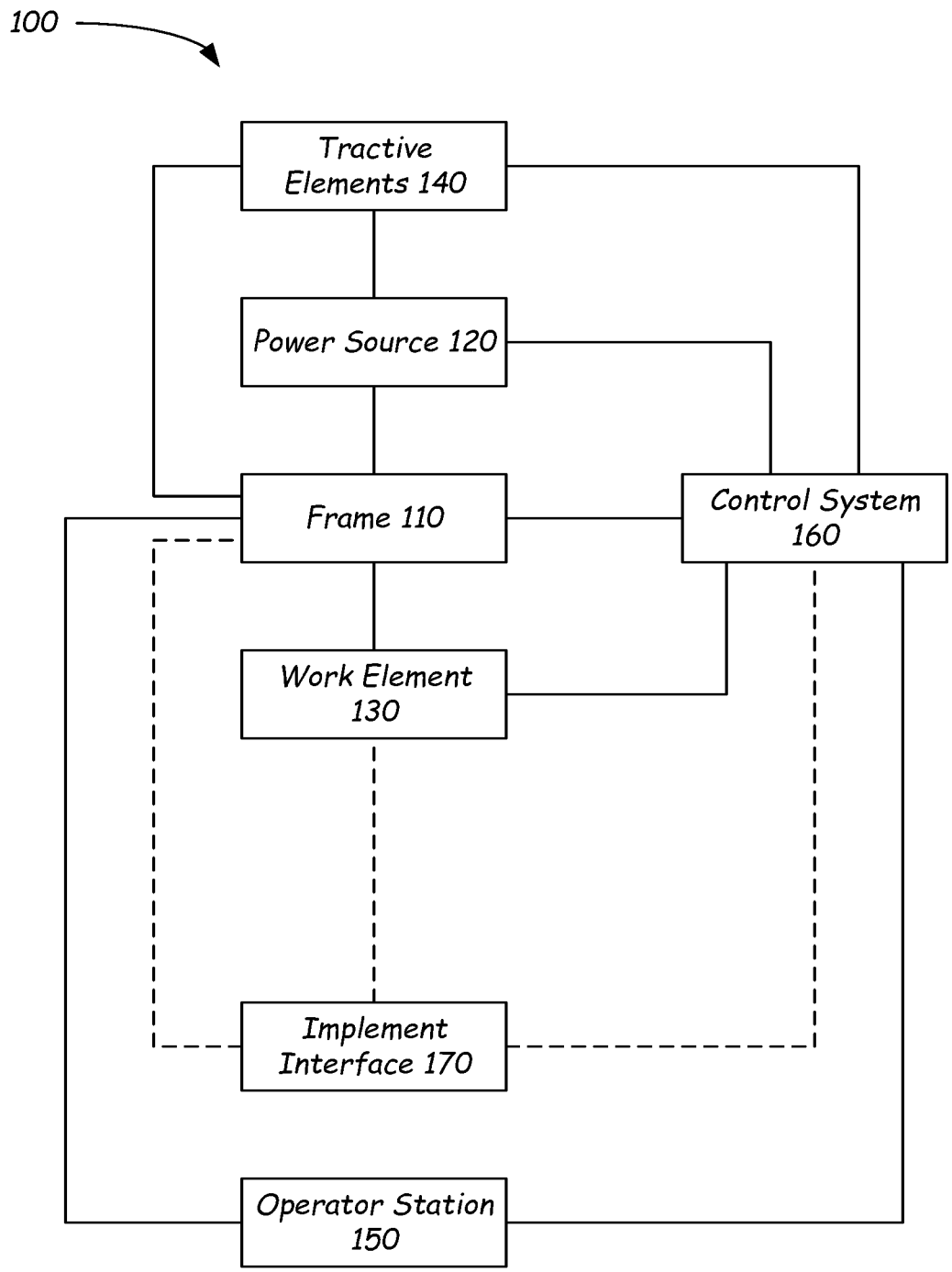
FIG. 1 is a block diagram illustrating functional systems of a representative power machine on which embodiments of the present disclosure can be advantageously practiced.

FIG. 1 is a block diagram that illustrates the basic systems of a power machine 100, which can be any of a number of different types of power machines, upon which the embodiments discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that are capable of performing a dedicated task. For example, some work vehicles have a lift arm to which an implement such as a bucket is attached such as by a pinning arrangement. The work element, i.e., the lift arm can be manipulated to position the implement for the purpose of performing the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that is capable of moving with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent or on the power machine. This can include applications where at least some of the operator controlled functions of the power machine can be operated from an operating position associated with an implement that is coupled to the power machine. Alternatively, with some power machines, a remote control device can be provided (i.e. remote from both of the power machine and any implement to which is it coupled) that is capable of controlling at least some of the operator controlled functions on the power machine.

FIGS. 2-3 illustrate a loader 200, which is one particular example of a power machine of the type illustrated in FIG. 1 where the embodiments discussed below can be advantageously employed. Loader 200 is a skid-steer loader, which is a loader that has tractive elements (in this case, four wheels) that are mounted to the frame of the loader via rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements.

Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Skid-steer loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system being capable of generating or otherwise providing power for operating various functions on the power machine. Power system 220 is shown in block diagram form, but is located within the frame 210. Frame 210 also supports a work element in the form of a lift arm assembly 230 that is powered by the power system 220 and is capable of performing various work tasks. As loader 200 is a work vehicle, frame 210 also supports a traction system 240, which is also powered by power system 220 and is capable of propelling the power machine over a support surface. The lift arm assembly 230 in turn supports an implement interface 270, which includes an implement carrier 272 that is capable of receiving and securing various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair.

The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that are capable of including and/or interacting with the embodiments discussed below can have various different frame components that support various work elements. The elements of frame 210 discussed herein are provided for illustrative purposes and frame 210 is not the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200, in some embodiments is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly to the mainframe 212) are collectively referred to as joints 216A and 216B (one is located on each of the upright portions 214) for the purposes of this discussion. Joints 216A and 216B are aligned along an axis 218 so that the lift arm assembly is capable of pivoting, as discussed below, with respect to the frame 210 about axis 218. Other power machines may not include upright portions on either side of the frame, or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements in the form of wheels 219A-D on either side of the loader 200.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e. the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e. along a pre-determined path) as is the case in the lift arm assembly 230 shown in FIG. 2. Some power machines have lift arm assemblies with a single lift arm, such as is known in excavators and even some loaders and other power machines. Other power machines can have a plurality of lift arm assemblies, each being independent of the other(s).

An implement interface 270 is provided proximal to a second end 232B of the lift arm assembly 234. The implement interface 270 includes an implement carrier 272 that is capable of accepting and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

Figure 4:
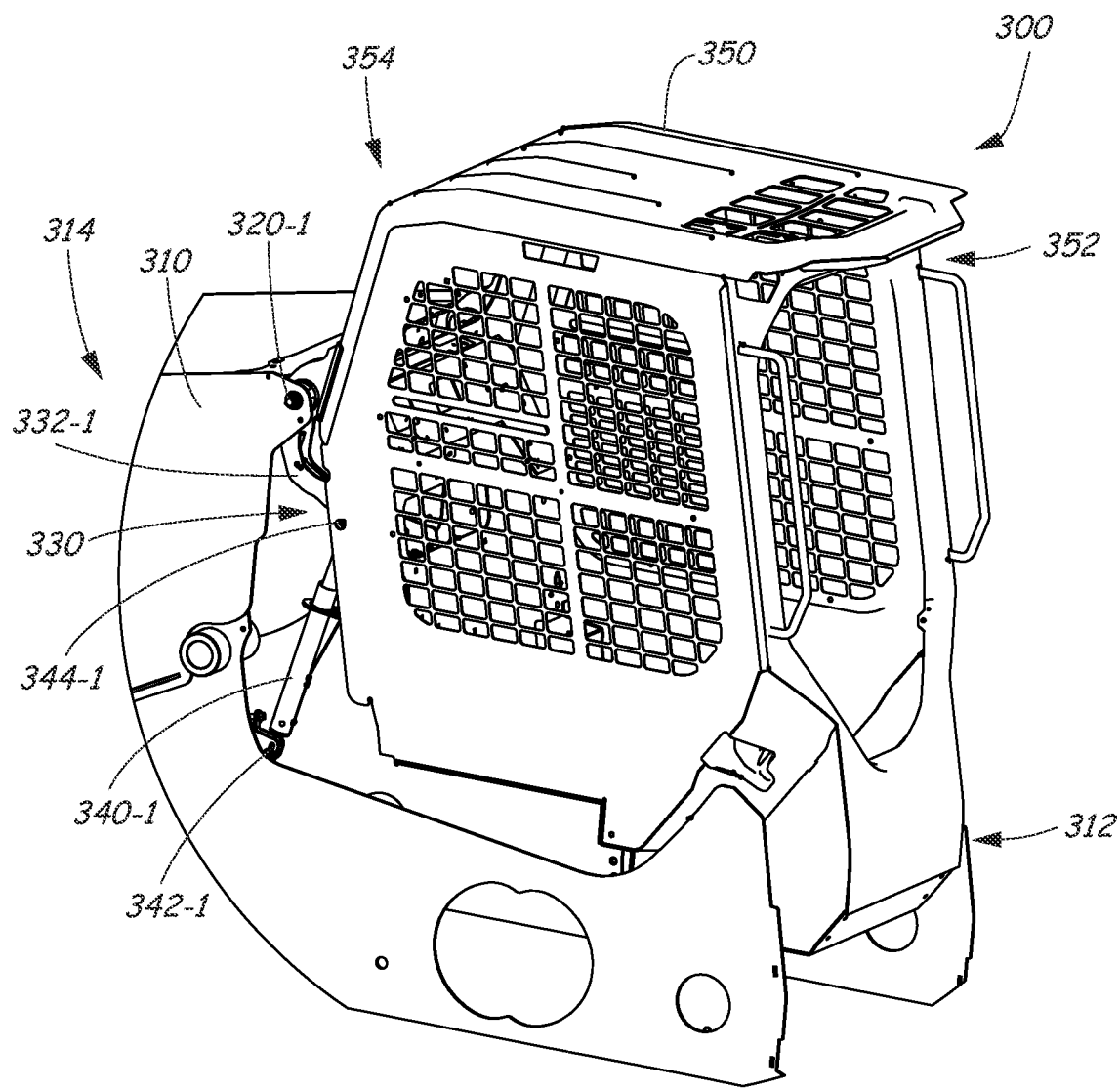
FIG. 4 is a perspective view front, right-hand side of a power machine showing portions of the power machine including a cab pivotally attached to a frame and having a link mechanism in accordance with exemplary embodiments for aiding in lifting the cab.

Frame 210 supports and generally encloses the power system 220 so that the various components of the power system 220 are not visible in FIGS. 2-3. FIG. 4 includes, among other things, a diagram of various components of the power system 220. Power system 220 includes one or more power sources 222 that are capable of generating and/or storing power for use on various machine functions. On power machine 200, the power system 220 includes an internal combustion engine. Other power machines can include electric generators, rechargeable batteries, various other power sources or any combination of power sources that are capable of providing power for given power machine components. The power system 220 also includes a power conversion system 224, which is operably coupled to the power source 222. Power conversion system 224 is, in turn, coupled to one or more actuators 226, which are capable of performing a function on the power machine. Power conversion systems in various power machines can include various components, including mechanical transmissions, hydraulic systems, and the like. The power conversion system 224 of power machine 200 includes a pair of hydrostatic drive pumps 224A and 224B, which are selectively controllable to provide a power signal to drive motors 226A and 226B. The drive motors 226A and 226B in turn are each operably coupled to axles, with drive motor 226A being coupled to axles 228A and 228B and drive motor 226B being coupled to axles 228C and 228D. The axles 228A-D are in turn coupled to tractive elements 219A-D, respectively. The drive pumps 224A and 224B can be mechanically, hydraulic, and/or electrically coupled to operator input devices to receive actuation signals for controlling the drive pumps.

The arrangement of drive pumps, motors, and axles in power machine 200 is but one example of an arrangement of these components. As discussed above, power machine 200 is a skid-steer loader and thus tractive elements on each side of the power machine are controlled together via the output of a single hydraulic pump, either through a single drive motor as in power machine 200 or with individual drive motors. Various other configurations and combinations of hydraulic drive pumps and motors can be employed as may be advantageous.

The power conversion system 224 of power machine 200 also includes a hydraulic implement pump 224C, which is also operably coupled to the power source 222. The hydraulic implement pump 224C is operably coupled to work actuator circuit 238C. Work actuator circuit 238 includes lift cylinders 238 and tilt cylinders 235 as well as control logic (such as one or more valves) to control actuation thereof. The control logic selectively allows, in response to operator inputs, for actuation of the lift cylinders and/or tilt cylinders. In some machines, the work actuator circuit also includes control logic to selectively provide a pressurized hydraulic fluid to an attached implement.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 5:
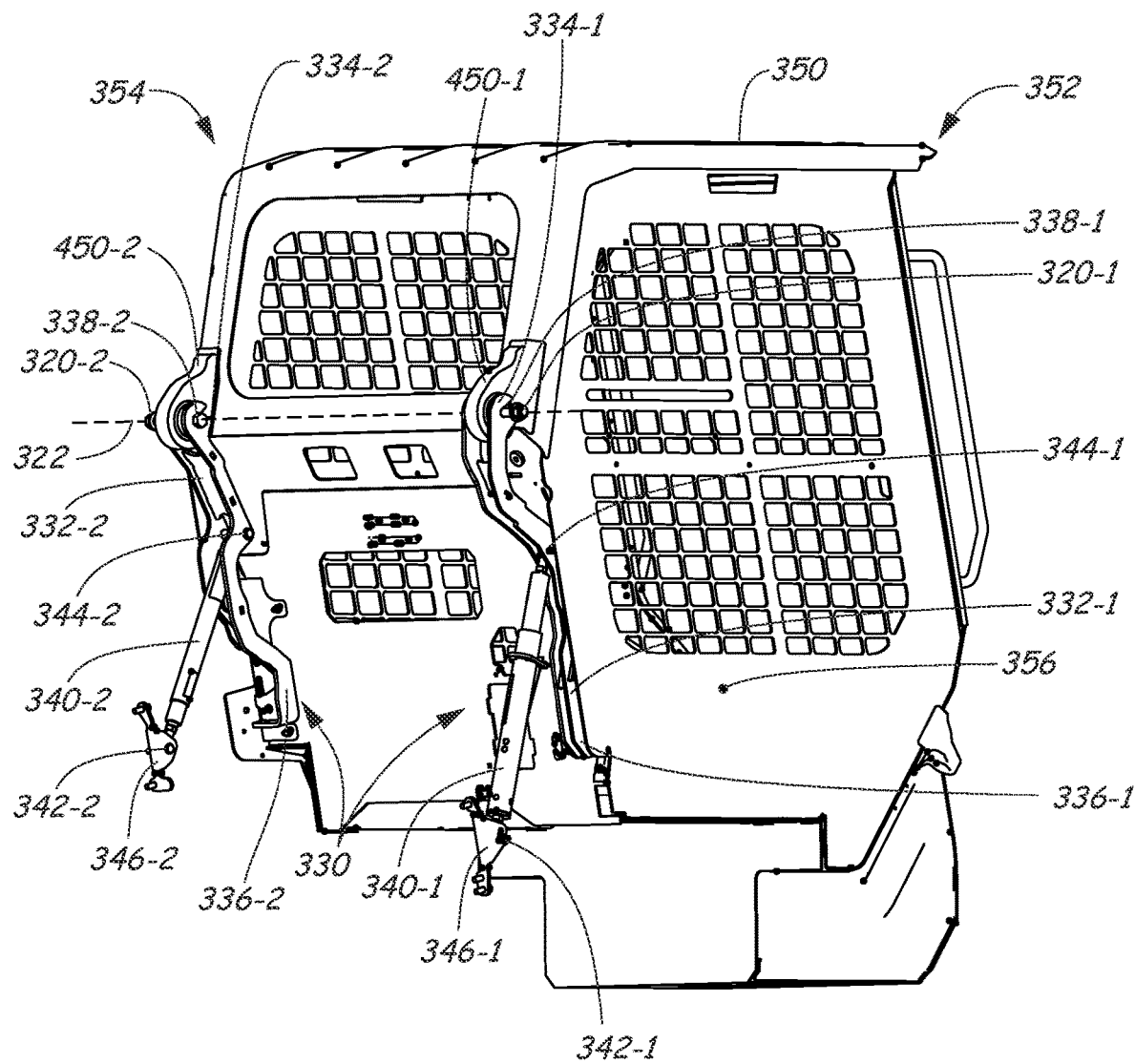
FIG. 5 is a perspective view of the cab and link mechanism shown in FIG. 4 from a rear, right-hand side.

FIG. 4 illustrates a front, right-hand side perspective view of a power machine 300 having a frame 310 and a cab 350 pivotally attached to the frame at one or more cab pivots. FIG. 5 illustrates a rear, right-hand side perspective view of the cab 350 not attached to the power machine. For the purposes of this discussion, the term right-hand to describe a side of the cab or power machine is from the perspective an operator who would be seated in the cab when the cab is attached to the power machine. The discussion below refers to both FIGS. 4 and 5. In this illustrative embodiment, the pivotal attachment of cab 350 to frame 310 is at a first cab pivot 320-1 and a second cab pivot 320-2, both positioned proximate a rear 354 of the cab such that the cab is configured to be pivoted backwards, relative to a front 312 of the frame, about a first transverse axis 322 from an operational position (as shown in FIG. 4) to a service position. In other embodiments, the cab may tip forward from an operating position to a service position. For illustrative purposes, a rear portion 314 of frame 310 and front side 352 of cab 350 are also designated in FIG. 4. The pivotal connection of cab 350 to frame 310 with first cab pivot 320-1 and second cab pivot 320-2 is accomplished in an exemplary embodiment using first and second frame mounts 410-1 and 410-2 and first and second cab mounts 450-1 and 450-2, as will be discussed below with reference to and is best seen in FIGS. 6 and 7, and fasteners in the form of pins 321-1 and 321-2, which secure the cab to the frame and allow the cab to pivot.

As mentioned above, a link mechanism 330 is included in power machine 300 for purposes of aiding in the lifting or rotating rearward of cab 350, from the illustrated operational position to a raised service position, about the first and second cab pivots 320-1 and 320-2. Link mechanism 330 illustratively includes a first link 332-1 and a second link 332-2. First link 332-1 has a first link end 334-1 and a second link end 336-1. The first link 332-1 includes a pivot engagement feature 338-1 that is pivotally engageable via the pin 320-1 to the frame and to the cab such that the first link 332-1 is pivotable about the same transverse axis 322 about which the cab pivots relative to the frame. As shown, the engagement feature is engaged and not fixedly attached, which provides easier assembly. In addition, the link mechanism is engaged with the cab via a bumper 480 (see FIG. 9), which provides additional noise isolation. The second link 332-2 of link mechanism 330 similarly has a first link end 334-2, a second link end 336-2, and a pivot engagement feature 338-2 that is likewise pivotally engageable with pin 321-2 such that the second link is also pivotable about the first transverse axis 322. In some exemplary embodiments such as is shown in FIGS. 4-5, the pivot engagement features 338-1 and 338-2 are positioned proximate the first link ends 334-1 and 334-2 of the respective first and second links. The second link ends 336-1 and 336-2 of the first and second links are configured to interface with the cab 350 at positions forward of (e.g. toward front end 352) and below the first and second cab pivots 320-1 and 320-2 and corresponding first and second link pivot engagement features 338-1 and 338-2 when the cab is in the operational (lowered) position. The embodiment shown in FIGS. 4-5 illustrates a link mechanism 330 that includes two separate links 332-1 and 332-2. In other embodiments, a link mechanism can have a single link that extends transversely across the back of the cab and that that is capable of engaging a fastener at each pivot.

The power machine 300 further includes first and second springs 340-1 and 340-2 each pivotally attached to the frame 310 at corresponding first spring joints 342-1 and 342-2. The first spring joints 342-1 and 342-2 are positioned below the first and second cab pivots 320-1 and 320-2 and below the first and second link pivot engagement features 338-1 and 338-2. These first spring joints 342-1 and 342-2 can be provided using spring brackets 346-1 and 346-2 which are secured or attached to frame 310 of the power machine, for example using bolts or other fasteners. The first and second springs 340-1 and 340-2 are also each respectively pivotally attached to the corresponding ones of the first and second links 332-1 and 332-2 at second spring joints 344-1 and 344-2. In exemplary embodiments, the second spring joints 344-1 and 344-2 are positioned in middle portions of the respective links, above the second link ends 336-1 and 336-2 when the cab is in the operational position. Further, in some embodiments, the second spring joints 344-1 and 344-2 are also positioned rearward of the second link ends 336-1 and 336-2 when the cab is in the operational position, though this need not be the case in all embodiments. It has further been found that in some exemplary embodiments, it is beneficial for the first and second links to be configured and positioned such that the second link ends 336-1 and 336-2 of the first and second links are positioned, in a front-to-back direction when the cab is in the operational position, between a center of gravity 356 of the cab and the first and second cab pivots 320-1 and 320-2 (or first and second link pivot engagement features 338-1 and 338-2).

Figure 6:
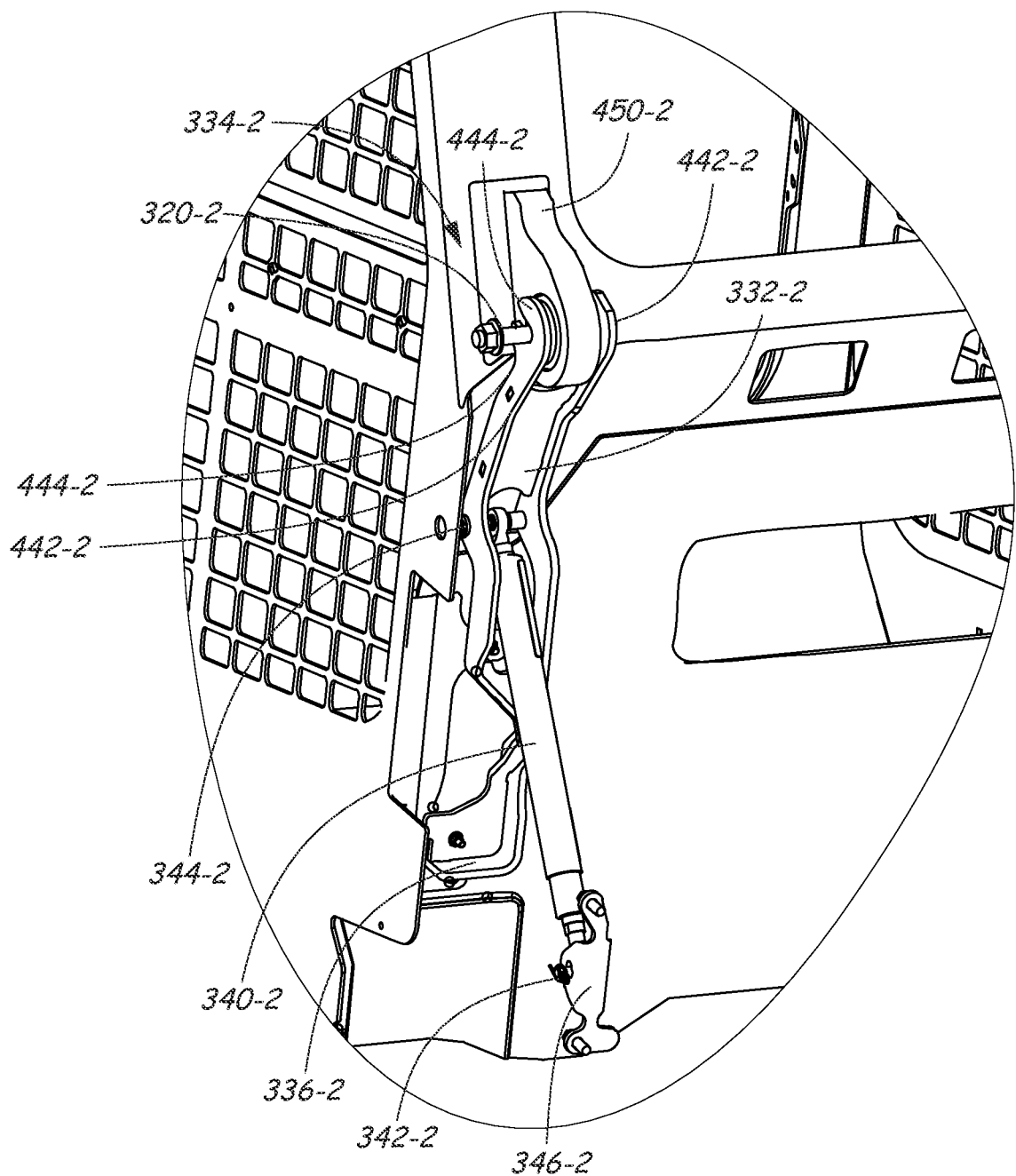
FIG. 6 is a perspective view of some features of the cab and link mechanism shown in FIGS. 4 and 5.
Figure 7:
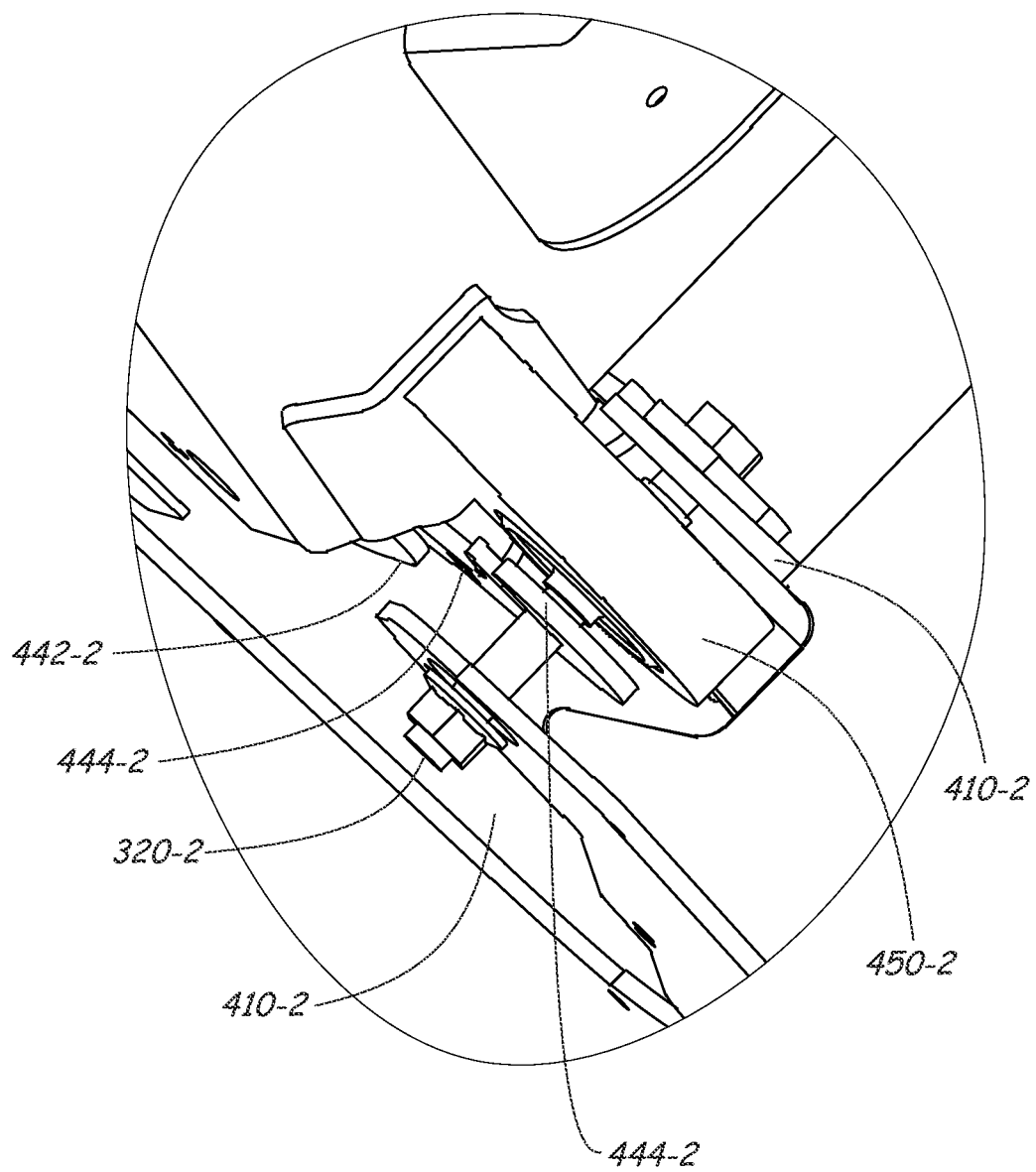
FIG. 7 is a perspective view illustration of one side of a cab pivot and a link pivot of the cab and link mechanisms shown in FIGS. 4-6 in accordance with some exemplary embodiments.

FIG. 6 is a rear, left-hand side perspective view illustrating of some features of one side of the cab and link mechanism shown in FIGS. 4 and 5. FIG. 7 is a top perspective view illustrating one side of the cab pivot and link pivot in accordance with some exemplary embodiments. As shown in FIG. 7, in exemplary embodiments, the frame 310 includes frame mounts 410 which can have bushings extending therethrough. FIG. 7 illustrates a frame mount 410-2 on one side (the right side) of the power machine, but those skilled in the art will recognize that a second frame mount is positioned on the opposing side of the power machine. In these exemplary embodiments, the first and second cab pivots 320-1 and 320-2 extend through the first and second frame mounts to pivotally attach the cab to the frame such that the cab is configured to be pivoted backwards about the first transverse axis 322 from the operational position to the service position. The cab pivots 320 (cab pivot 320-2 shown in FIGS. 6 and 7) can be formed using pins or bolts as illustrated.

Figure 8:
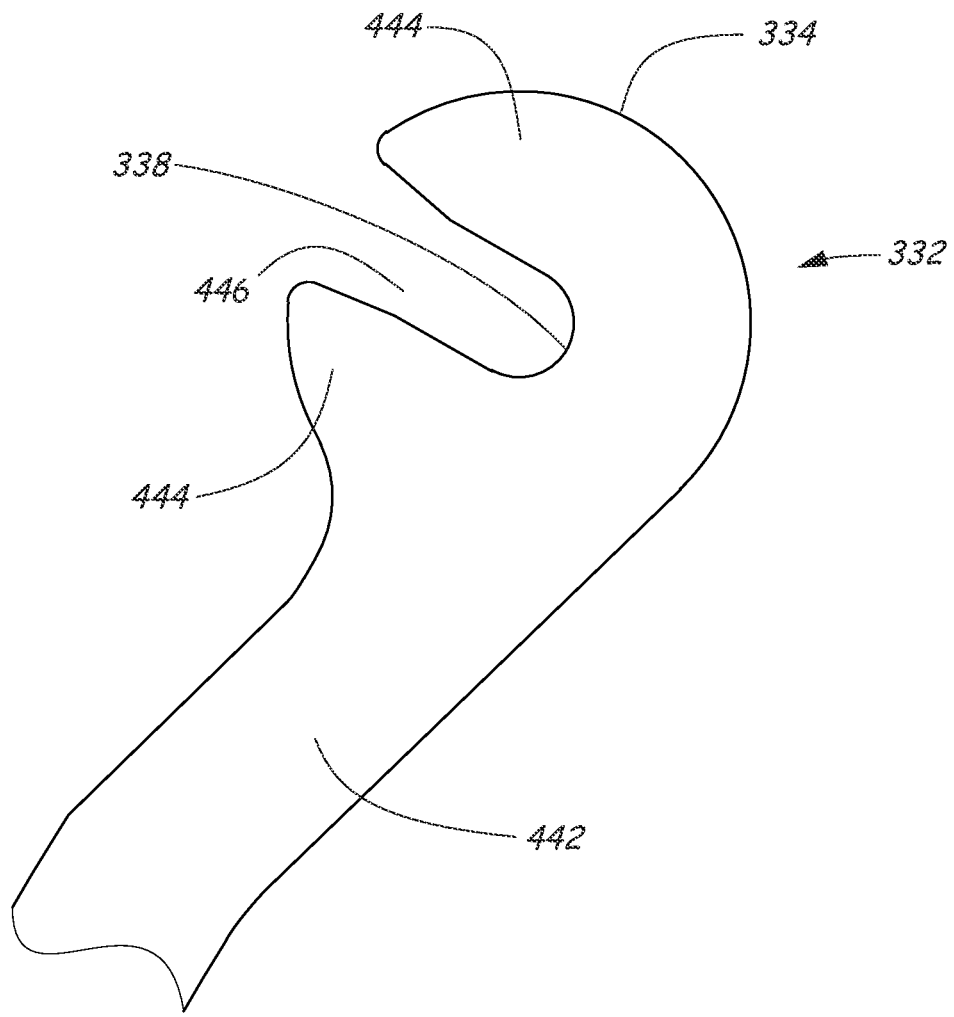
FIG. 8 is a diagrammatic side view of a portion of a link arm of an exemplary link mechanism and illustrates finger members of the link arm forming a link pivot configuration.

The cab 350 includes cab mounts 450, illustrated as first cab mount 450-1 (shown in FIG. 5) and second cab mount 450-2 (shown in FIGS. 5-7) on opposing sides of the power machine. The cab mounts are positioned between the corresponding frame mounts. The first cab pivot 320-1 extends through the first cab mount 450-1 and the first frame mount, while the second cab pivot 320-2 extends through the second cab mount 450-2 and the second frame mount when the cab is assembled to the frame. As shown in FIG. 6 for second link 332-2 and in FIG. 8 for a generic link 332, the links 332 include first and second link arms 442 (labeled 442-2 for second link 332-2) which provide the first link ends 334 (labeled 334-2 for second link 332-2). In this illustrated embodiment, each of the first and second link arms 442 include finger members 444 (labeled 444-2 for second link 332-2) at the first link end. The finger members form a gap 446 for the respective pivot engagement feature 338 (e.g., pivot engagement features 338-1 and 338-2). The finger members 444 are configured to be positioned over the respective first or second cab pivot pins, with the particular cab pivot pin positioned in the gap 446. Using this configuration, with a pin or other cab pivot mechanism in place pivotally mounting the cab to the frame, the link mechanisms engage the cab pivot pin, with the cab pivot between the finger members, such that the link mechanism isn't fixed to the cab or frame, but is maintained in position as shown. As mentioned above, this aids in simplifying assembly of the power machine. With the cab pivotally mounted on the frame and moved into the upright or service position, the links can be slid in between the frame (at frame mounts 410-1 and 410-2) and the cab (at cab mounts 450-1 and 450-2). The springs 340-1 and 340-2 can then be bolted to the frame using spring brackets 346-1 and 346-2. Other attachment techniques can also be used.

Figure 9:
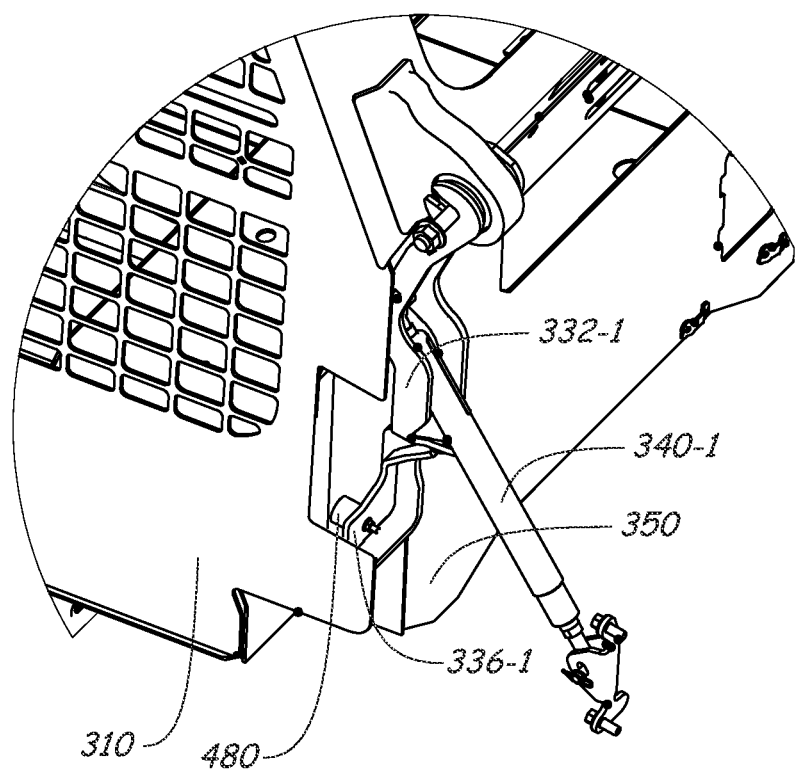
FIG. 9 is a perspective view of a bottom end portion of a link of the link mechanism, in accordance with some exemplary embodiments, which interfaces with the cab through a vibration dampening bumper material.

Referring now to FIG. 9, shown is a bottom portion of first link 332-1 illustrating further features of some exemplary embodiments. Second end 336-1 of first link 332-1 is not rigidly or fixedly secured to cab 350 in this embodiment. Instead, a bumper 480 formed from vibration dampening material is positioned between the second link end 336-1 and the cab 350 such that the second link end interfaces with the cab through the bumper. In the illustrated embodiment, bumper 350 is secured to second link end 336-1 of link 332-1, but in other embodiments the bumper can be secured to the cab instead. Using the bumper configuration shown in FIG. 9, on each of the first and second links 332-1 and 332-2, the cab can be provided some isolation or dampening from vibrations being transferred through the links.

Although the present invention has been described with reference to preferred embodiments, workers skilled in the art will recognize that changes may be made in form and detail without departing from the scope of the discussion.

What is claimed is:

1. A power machine comprising:
    a frame;
    a cab pivotally attached to the frame at a first cab pivot proximate a rear of the cab such that the cab is configured to be pivoted backwards, relative to a front of the frame, about a first transverse axis from an operational position to a service position;
    a link mechanism, the link mechanism comprising a first link having a first link end, a second link end, and a first pivot engagement feature pivotally coupling the first link to the frame and to the cab such that the first link is pivotal about the first transverse axis, wherein the second link end is configured to interface with the cab at a position forward of and below the first cab pivot and first pivot engagement feature when the cab is in the operational position and wherein at least a portion of the first link is separate from and spaced apart from the frame and the cab; and
    a first spring pivotally attached to the frame at a first spring joint positioned below the first cab pivot and first pivot engagement feature, the first spring being pivotally attached to the first link at a second spring joint positioned above the second link end of the first link when the cab is in the operational position.

2. The power machine of claim 1, wherein the first pivot engagement feature is positioned proximate the first link end.

3. The power machine of claim 1, wherein the second spring joint is also positioned rearward of the second link end when the cab is in the operational position.

4. The power machine of claim 1, wherein the frame includes first and second frame mounts on opposing sides of the power machine, wherein the first cab pivot extends through the first frame mount, and wherein the power machine includes a second cab pivot extending through the second frame mount and pivotally attaching the cab to the frame such that the cab is configured to be pivoted backwards, relative to the front of the frame, about the first transverse axis from the operational position to the service position.

5. The power machine of claim 4, wherein the cab includes first and second cab mounts on opposing sides of the power machine, wherein the first cab pivot also extends through the first cab mount; and wherein the second cab pivot also extends through the second cab mount.

6. The power machine of claim 5, wherein the link mechanism further comprises a second link having a first link end, a second link end, and a second 1 pivot engagement feature pivotally coupling the second link to the frame and to the cab such that the second link is also pivotal about the first transverse axis, wherein the second link end of the second link is configured to interface with the cab at a second position forward of and below the second cab pivot and second pivot engagement feature when the cab is in the operational position, the power machine further comprising a second spring pivotally attached to the frame at a first second spring joint positioned below the second cab pivot and second pivot engagement feature, the second spring being pivotally attached to the second link at a second spring joint positioned above the second link end of the second link when the cab is in the operational position.

7. The power machine of claim 1, wherein the second link end of the first link is positioned, in a front-to-back direction, between a center of gravity of the cab and the first cab pivot and first pivot engagement feature when the cab is in the operational position.

8. The power machine of claim 7, and further comprising a bumper formed from vibration dampening material, the bumper positioned between the second link end and the cab such that the second link end interfaces with the cab through the bumper.

9. The power machine of claim 1, and wherein the first link includes first and second link arms which provide the first link end.

10. The power machine of claim 9, wherein each of the first and second link arms of the first link include finger members at the first link end, the finger members forming a gap for the first pivot engagement feature.

11. The power machine of claim 10, wherein the finger members are configured to be positioned over the first cab pivot with the first cab pivot positioned in the gap.

12. A link mechanism and spring apparatus for a power machine, the power machine having a frame and a cab pivotally attached to the frame at a first cab pivot proximate a rear of the cab such that the cab is configured to be pivoted backwards, relative to a front of the frame, about a first transverse axis from an operational position to a service position, the link mechanism and spring apparatus comprising;
    a first link of the link mechanism having a first link end, a second link end, and a first pivot engagement feature pivotally coupling the first link to the frame and to the cab such that the first link is pivotal about the first transverse axis, wherein the second link end is configured to interface with the cab at a position forward of and below the first cab pivot and first pivot engagement feature when the cab is in the operational position;
    a first spring pivotally attached to the frame at a first spring joint positioned below the first cab pivot and first pivot engagement feature, the first spring being pivotally attached to the first link at a second spring joint positioned above the second link end when the cab is in the operational position; and
    a bumper formed from vibration damping material, the bumper positioned between the second link end and the cab such that the second link end interfaces with the cab through the bumper.

13. The link mechanism and spring apparatus of claim 12, wherein the first pivot engagement feature is positioned proximate the first link end.

14. The link mechanism and spring apparatus of claim 13, wherein the second spring joint is also positioned rearward of the second link end when the cab is in the operational position.

15. The link mechanism and spring apparatus of claim 14, wherein the second link end of the first link is positioned, in a front-to-back direction, between a center of gravity of the cab and the first cab pivot and first pivot engagement feature when the cab is in the operational position.

16. The link mechanism and spring apparatus of claim 14, wherein the power machine frame includes a first frame mount, wherein the power machine cab includes a first cab mount, wherein the first cab pivot extends through the first frame mount and the first cab mount, and wherein the first link includes first and second link arms which provide the first link end adjacent the first frame mount and the first cab mount.

17. The link mechanism and spring apparatus of claim 16, and wherein the first link includes first and second link arms which provide the first link end.

18. The link mechanism and spring apparatus of claim 17, wherein each of the first and second link arms of the first link include finger members at the first link end, the finger members forming a gap for the first pivot engagement feature.

19. The link mechanism and spring apparatus of claim 18, wherein the finger members are configured to be positioned over the first cab pivot with the first cab pivot positioned in the gap.

20. A power machine comprising:
 a frame;
 a cab pivotally attached to the frame at a first cab pivot proximate a rear of the cab such that the cab is configured to be pivoted backwards, relative to a front of the frame, about a first transverse axis from an operational position to a service position;
 a link mechanism, the link mechanism comprising a first link having a first link end, a second link end, and a first pivot engagement feature pivotally coupling the first link to the frame and to the cab such that the first link is pivotal about the first transverse axis, wherein the second link end is configured to interface with the cab at a position forward of and below the first cab pivot and first pivot engagement feature when the cab is in the operational position; and
 a first spring pivotally attached to the frame at a first spring joint positioned below the first cab pivot and first pivot engagement feature, the first spring being pivotally attached to the first link at a second spring joint positioned above the second link end of the first link when the cab is in the operational position; and
 wherein the first link includes finger members at the first link end, the finger members forming a gap for the first pivot engagement feature.

* * * * *